United States Patent [19]
Stockwell

[11] Patent Number: 5,237,811
[45] Date of Patent: Aug. 24, 1993

[54] ROTARY INTERNAL COMBUSTION ENGINE APPARATUS

[76] Inventor: James K. Stockwell, 6040 SW. 9th St., Plantation, Fla. 33317

[21] Appl. No.: 910,421

[22] Filed: Jul. 8, 1992

Related U.S. Application Data

[63] Continuation-in-part of Ser. No. 634,019, Dec. 26, 1990, abandoned.

[51] Int. Cl.$^5$ ............................................. F02C 5/12
[52] U.S. Cl. .................................. 60/39.39; 60/39.78
[58] Field of Search ................ 60/39.36, 39.37, 39.38, 60/39.39, 39.40, 39.76, 39.78; 415/181

[56] References Cited

U.S. PATENT DOCUMENTS

| | | | |
|---|---|---|---|
| 2,557,198 | 6/1951 | Nichols | 60/39.39 |
| 2,675,675 | 4/1954 | Haueter | 60/39.39 |
| 2,831,320 | 4/1958 | Duncan | 60/39.35 |
| 2,928,242 | 3/1960 | Guenther | 60/39.39 |
| 3,877,219 | 4/1975 | Hagen | 60/39.39 |
| 4,791,784 | 12/1988 | Minardi et al. | 60/39.39 |

*Primary Examiner*—Louis J. Casaregola
*Attorney, Agent, or Firm*—Oltman and Flynn

[57] ABSTRACT

An internal combustion engine apparatus includes a structure defining an internal combustion chamber having opposite first and second ends, a mechanism for introducing fuel into the chamber, a mechanism for admitting air into the chamber at its first end to mix with fuel in the chamber and form a combustible fuel/air mixture, a mechanism for igniting the fuel/air mixture in the chamber, a mechanism at the second end of the chamber for passing the pressurized products of combustion therefrom, a turbine driven by the pressurized products of combustion leaving the second end of the chamber, a diffuser located between the turbine and the combustion chamber, the diffuser having a structure for deflecting angularly the pressurized products of combustion leaving the second end of the combustion chamber for breaking up the flow of the pressurized products of combustion leaving the chamber.

20 Claims, 9 Drawing Sheets

ROTARY INTERNAL COMBUSTION ENGINE APPARATUS

RELATED APPLICATION

This application is a continuation-in-part of Ser. No. 07/634,019 filed Dec. 26, 1990 (abandoned).

SUMMARY OF THE INVENTION

This invention relates to an internal combustion engine apparatus having one or more internal combustion chambers and one or more turbines driven by products of combustion leaving the combustion chamber(s).

Preferably, the engine apparatus of the present invention has at least one pair of internal combustion engines having a rotary inlet valve at one end which controls the admission of pressurized air into the combustion chambers. At the opposite end of the pair of combustion chambers, a turbine has a rotor which is driven by the pressurized products of combustion leaving the combustion chambers a predetermined time interval after the inlet valves close and the combustible fuel/air mixtures in the respective combustion chambers are ignited. The turbine rotor has an end piece next to the combustion chambers which acts as a rotary valve controlling the passage of the products of combustion from the combustion chambers into the turbine. A respective diffuser is located between each combustion chamber and this end piece of the turbine rotor to impart a spin to the products of combustion leaving the combustion chamber.

A principal object of this invention is to provide a novel rotary internal combustion engine apparatus.

Another object of this invention is to provide such an apparatus in which a turbine is driven by the pressurized products of combustion leaving an internal combustion chamber in timed relation to the introductions of fuel and pressurized air into the chamber and the igniting of the fuel/air mixture in the chamber.

Further objects and advantages of this invention will be apparent from the following detailed description of a presently preferred embodiment which is illustrated schematically in the accompanying drawings.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION

Figure 2:
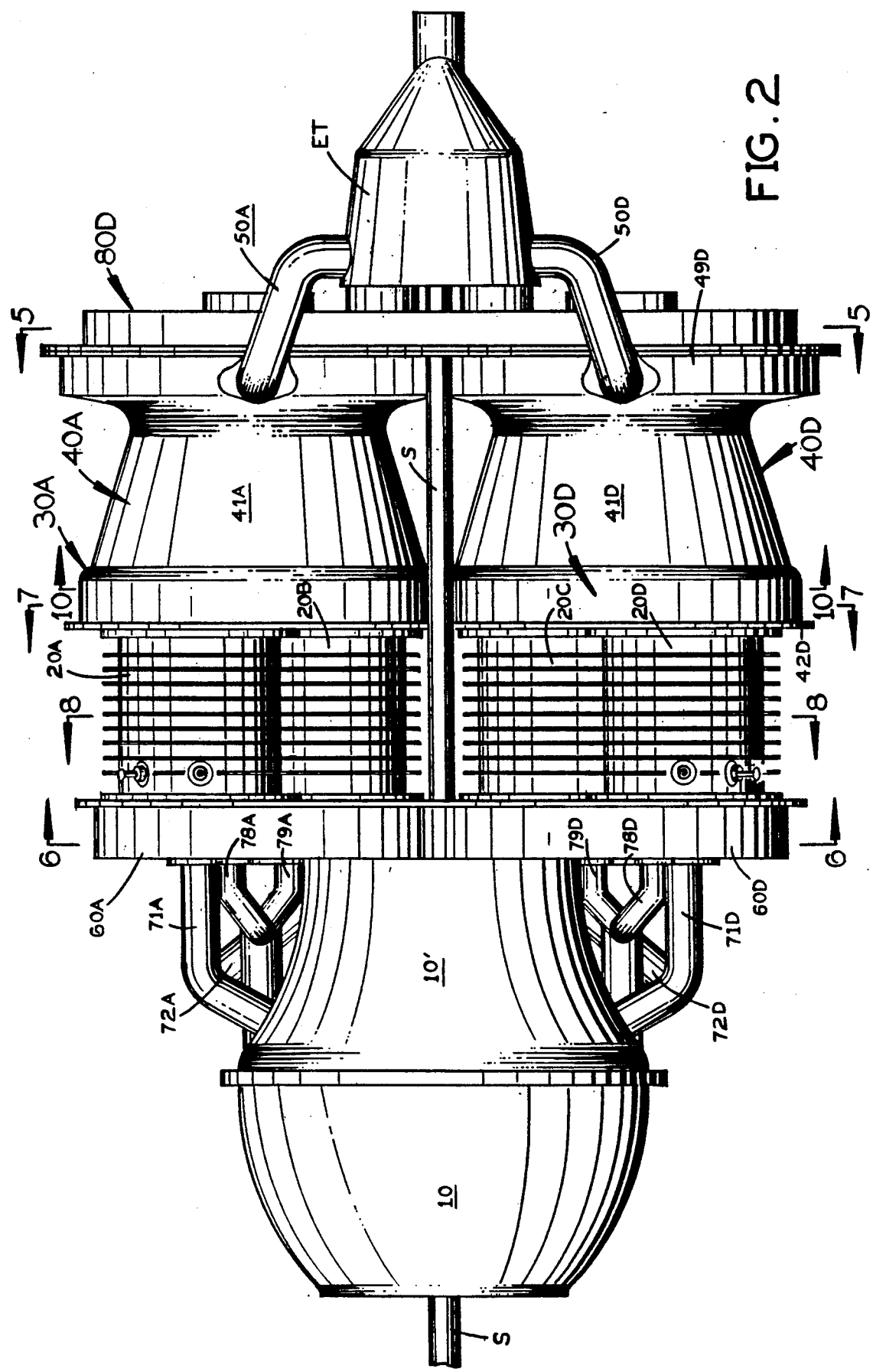
FIG. 2 is a top plan view of this apparatus.

In broad outline, the illustrated embodiment of the present invention comprises (FIG. 2):

a two-stage centrifugal air compressor 10, 10';

four stationary internal combustion chambers 20A, 20B, 20C and 20D;

a first rotary valve 60A at the inlet end of combustion chambers 20A and 20B;

a second rotary valve 60D at the inlet end of combustion chambers 20C and 20D;

a first stationary diffuser 30A at the outlet end of combustion chambers 20A and 20B;

a second stationary diffuser 30D at the outlet end of combustion chambers 20C and 20D;

a first turbine 40A driven by the products of combustion from combustion chambers 20A and 20B flowing through the first diffuser 30A;

a second turbine 40D driven by the products of combustion from combustion chambers 20C and 20D flowing through the second diffuser 30D;

an output gear assembly 50 driven by turbines 40A and 40D;

a main output shaft S driven through the output gear assembly 50; and an exhaust turbine ET with a rotor connected to shaft S at the right end in FIG. 2.

Figure 1:
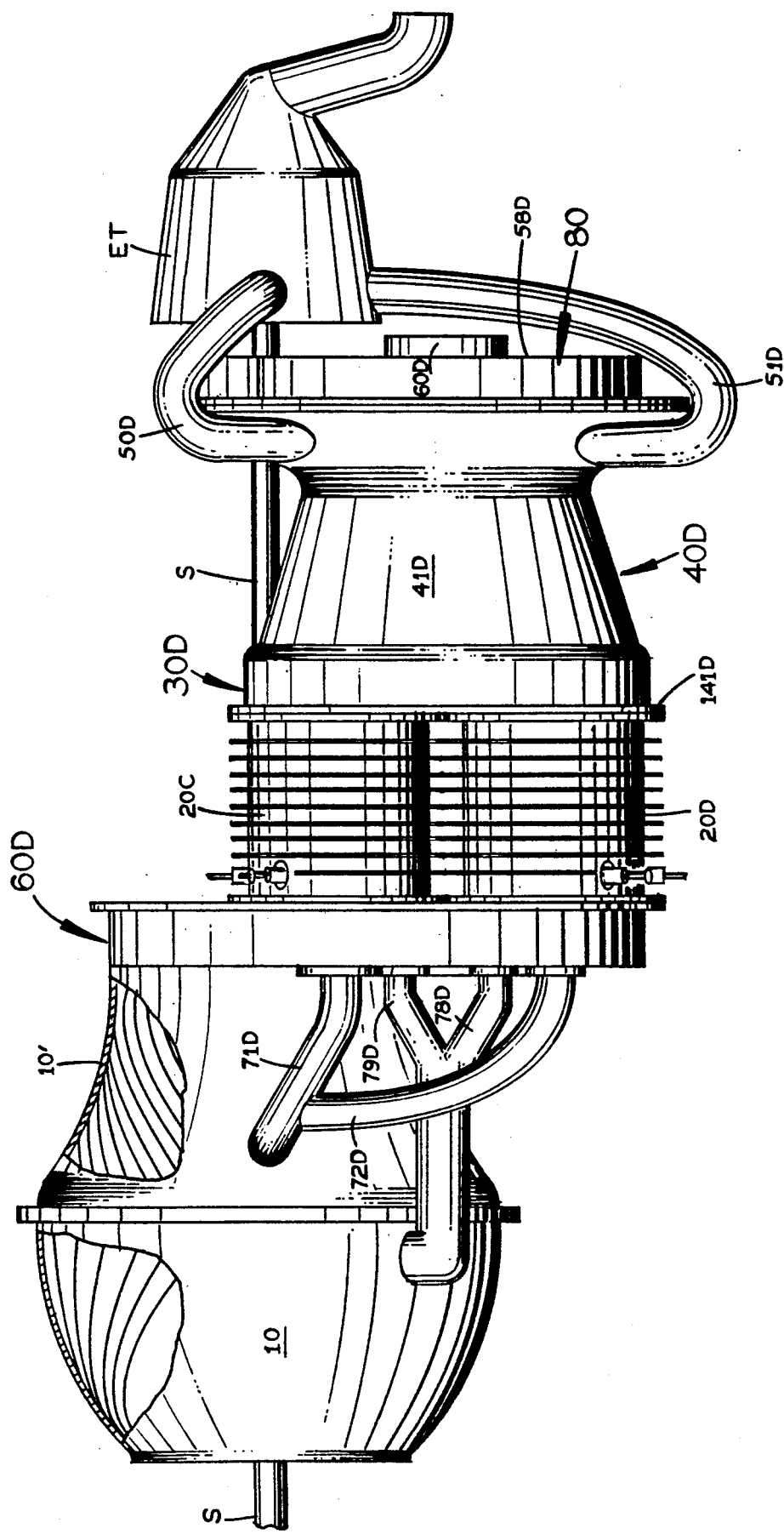
FIG. 1 is a side elevation of an engine apparatus in accordance with this invention.

Beginning at the left end of the assembly in FIGS. 1 and 2, the two-stage air compressor 10, 10' is of known design and therefore is not shown in detail.

Figure 6:
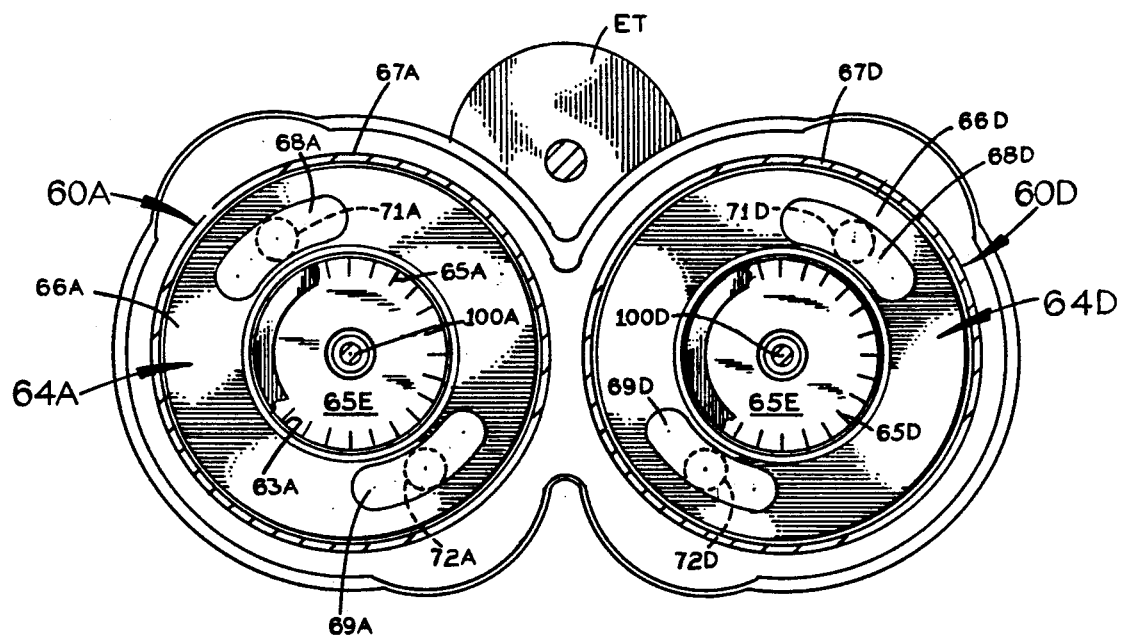
FIG. 6 is a cross-section taken along the line 6—6 in FIG. 2 through air inlet valves for the combustion chambers in the apparatus.
Figure 9:
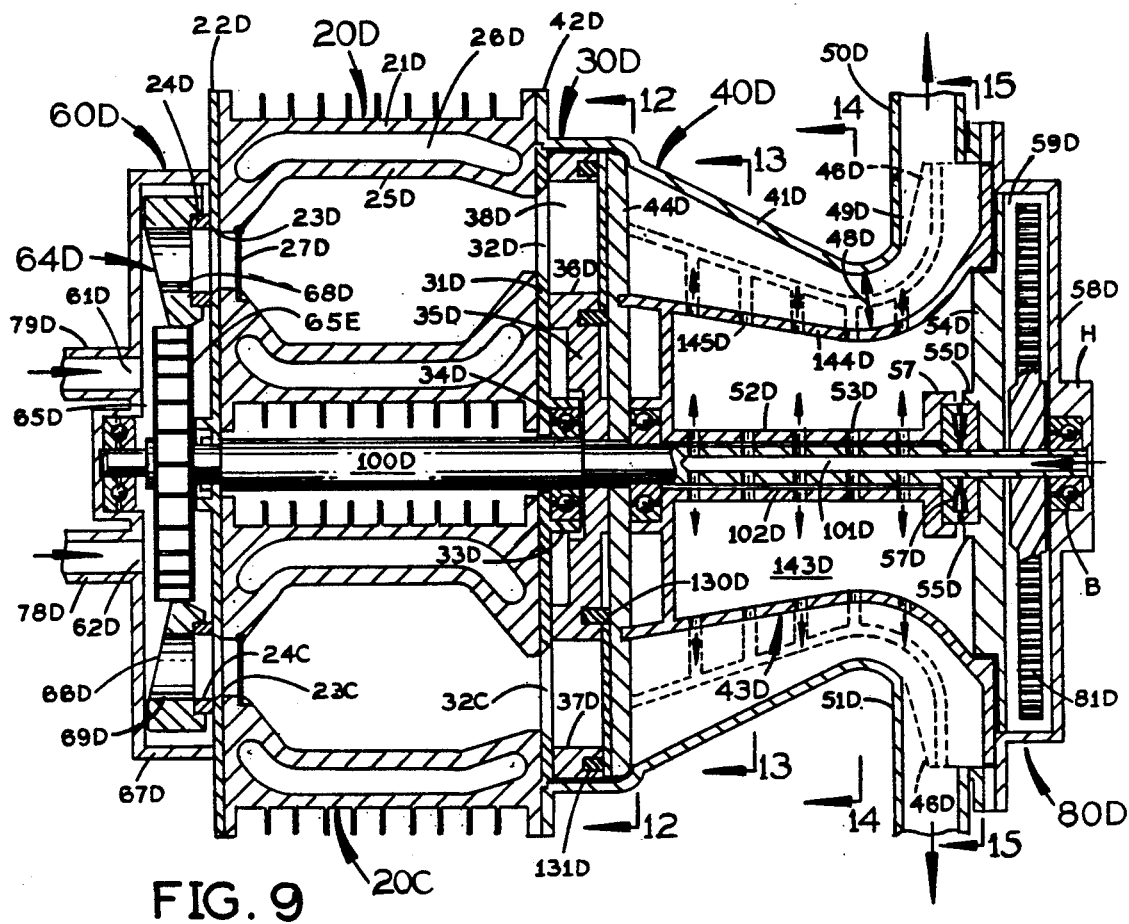
FIG. 9 is a longitudinal section taken along the line 9—9 in FIG. 4 through one pair of internal combustion chambers and the corresponding turbine in the engine apparatus.

Referring to FIGS. 6 and 9, the rotary inlet valve 60D for internal combustion chambers 20C and 20D has a stationary, generally cylindrical housing 67D with a rotor 64D inside. Rotor 64D has a central opening 63D in which a fan 65D is located and an annular outer segment 66D outside this opening which is welded to the tips of the fan blades. This outer segment of the rotor has arcuate openings 68D and 69D located diametrically opposite each other. Centrifugal fan 65D, mounted on fan plate 65E, throws air radially outward into arcuate openings 68D and 69D which have entrances angled to overhang the rotor axis, as shown in FIG. 9. Centrifugal fan 65D thereby increases the velocity of air entering chambers 20C and 20D. This increased air entrance velocity creates a power-enhancing supercharging effect in chambers 20C and 20D.

The first stage 10 of the air compressor delivers air via pipes 78D and 79D (FIG. 1) air to the fan 65D to rotate the rotor 64D. These pipes lead into the central opening 63D in the rotor of inlet valve 60D.

Figure 3:
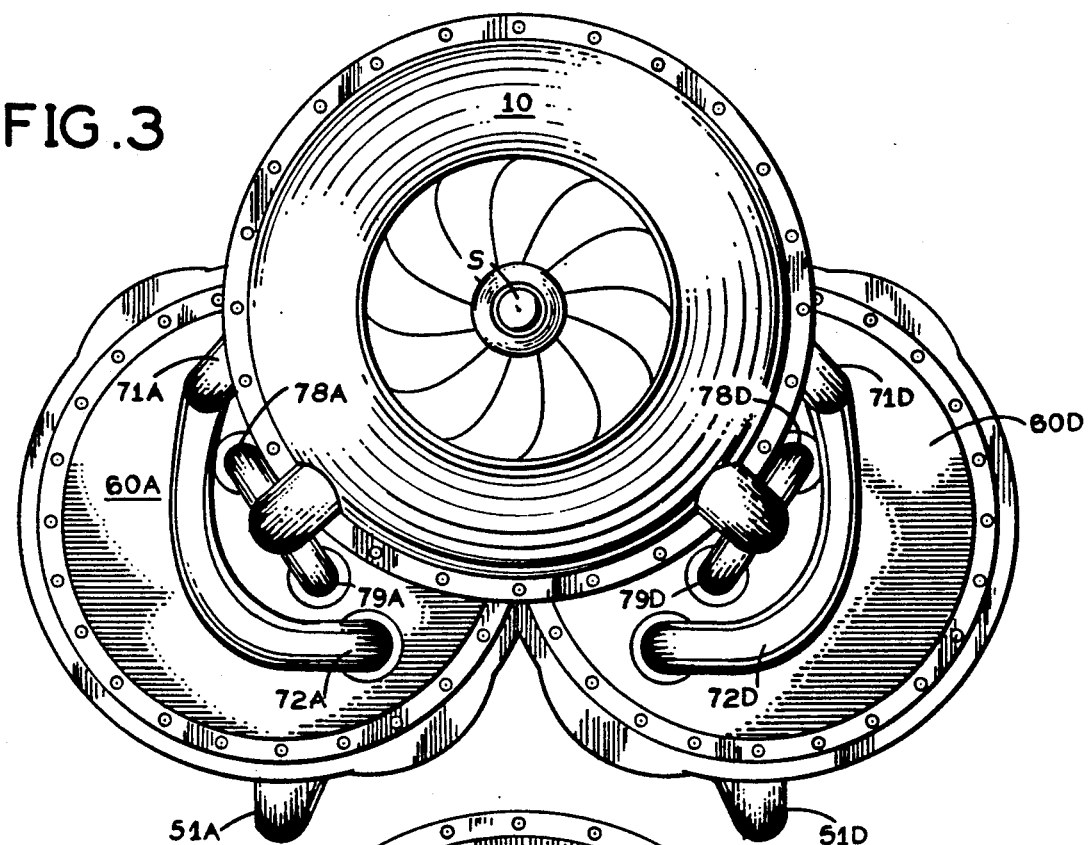
FIG. 3 is an end elevation taken from the left end of FIGS. 1 and 2.
Figure 4:
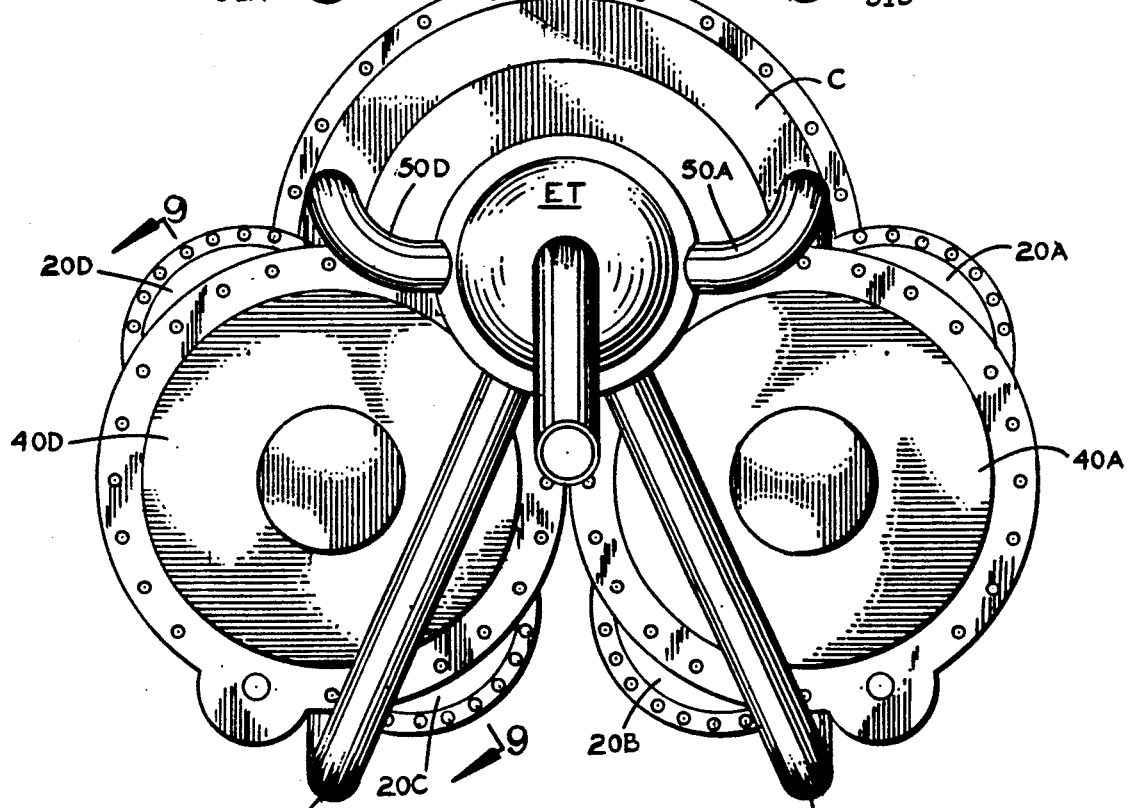
FIG. 4 is an end elevation taken from the right end of FIGS. 1 and 2.

The second stage 10' of the air compressor delivers pressurized air to the rotary valve 60D which passes through the arcuate openings 68D and 69D in its rotor into the combustion chambers 20C and 20D. The air compressor's second stage 10' on the right side in FIG. 3 has two air outlet pipes 71D and 72D (FIGS. 1 and 2) which are connected to the housing 67D of the rotary inlet valve 60D at the radial positions of the arcuate openings 68D and 69D in valve rotor 64D outward from its carbon seal ring 164D. FIG. 6 shows the rotational position of valve rotor 64D in which its arcuate opening 68D registers with pipe 71D and its arcuate opening 69D registers with pipe 72D. When its arcuate openings 68D and 69D are out of registration with either air inlet pipe 71D or 72D, the valve rotor 64D blocks the flow of air from compressor 10,10' into combustion chambers 20C and 20D.

Valve rotor 64D is affixed to one end of a rotary horizontal shaft 100D (FIGS. 6, 7 and 9) extending longitudinally of the assembly between combustion chambers 20C and 20D.

The other rotary inlet valve 60A (FIG. 6) has an identical construction. It controls the flow of air from the second stage 10' of the air compressor through pipes 71A and 72A (FIGS. 2 and 3) into combustion chambers 20A and 20B. The rotor of valve of 60A is on one end of a horizontal shaft 100A (FIG. 6) extending longitudinally of the assembly between combustion chambers 20A and 20B. Elements of rotary valve 60A which correspond to those of valve 60D are given the same reference numerals in FIG. 6 but with an "A" suffix instead of a "D" suffix.

As shown in FIG. 9, the combustion chamber 20D has an annular housing 21D with a flat end plate 22D that has a circular first air inlet opening 23D. A carbon sealing ring 24D encircles this opening (FIG. 6) and is slidably engaged by the outer annular segment 66D of valve rotor 64D in substantially air-tight fashion.

Similarly, the combustion chamber 20C has a housing 21C covered by a flat end plate 22C with a circular opening 23C. A carbon sealing ring 24C encircles this opening and is slidably engaged by the outer annular segment 66D of valve rotor 64D in substantially air-tight fashion.

Figure 8:
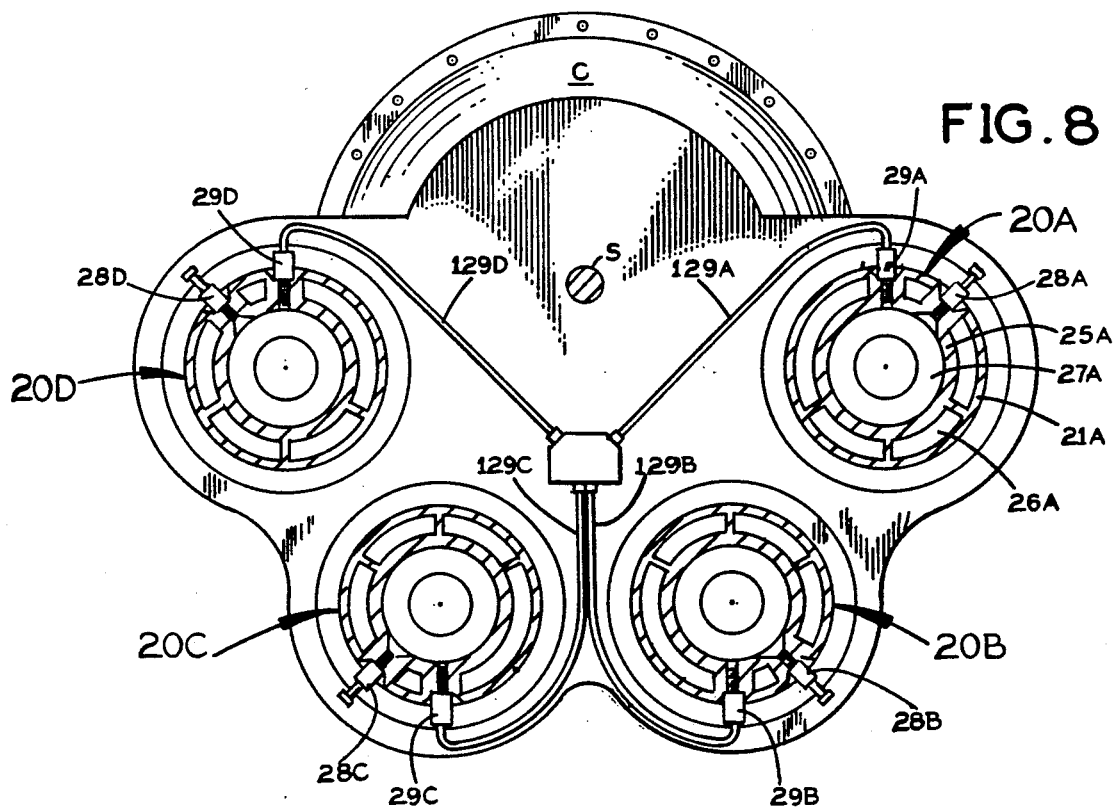
FIG. 8 is a cross-section taken along the line 8—8 in FIG. 2 through the combustion chambers in the engine apparatus.

Referring to FIG. 8, the four combustion chambers 20A, 20B, 20C and 20D are identical. Chamber 20A, for example, has a housing 21A with a generally cylindrical outer wall and a cylindrical inner wall 25A separated from the outer wall by a chamber 26A in which a liquid coolant, such as water, is circulated. This combustion chamber has a spark plug 28A and a fuel injector 29A of a known design. The fuel injectors 29A, 29B, 29C and 29D of the four combustion chambers receive suitable fuel via fuel injection lines 129A, 129B, 129C and 129D.

A flap valve 27D is located at the inlet end of combustion chamber 20D (the left end in FIG. 9). This flap valve is pivoted at its upper end and it is normally closed. Pressurized air flowing through the arcuate openings 68D and 69D in the rotor 64D of inlet valve 60D will open this flap valve, and an explosion of the combustible fuel/air mixture in the combustion chamber 60D will close it. A similar flap valve is provided at the air inlet end of each of the other combustion chambers.

The diffuser 30D and the turbine 40D in FIGS. 1 and 2 have a single housing 41D with a transverse, outwardly projecting, annular, end flange 42D engaging the housings of combustion chambers 20C and 20D. Diffuser 30D has an end plate 31D (FIG. 9) which engages the outlet end of combustion chambers 30C and 30D inside the flange 42D of housing 41D. This end plate has an opening 32C that passes the products of combustion from combustion chamber 20C and an opening 32D that passes the products of combustion from combustion chamber 20D. End plate 31D has an axially projecting cylindrical flange 33D holding a ball bearing 34D which rotatably supports the shaft 100D to which the rotor 64D of inlet valve 60D is attached.

Figure 7:
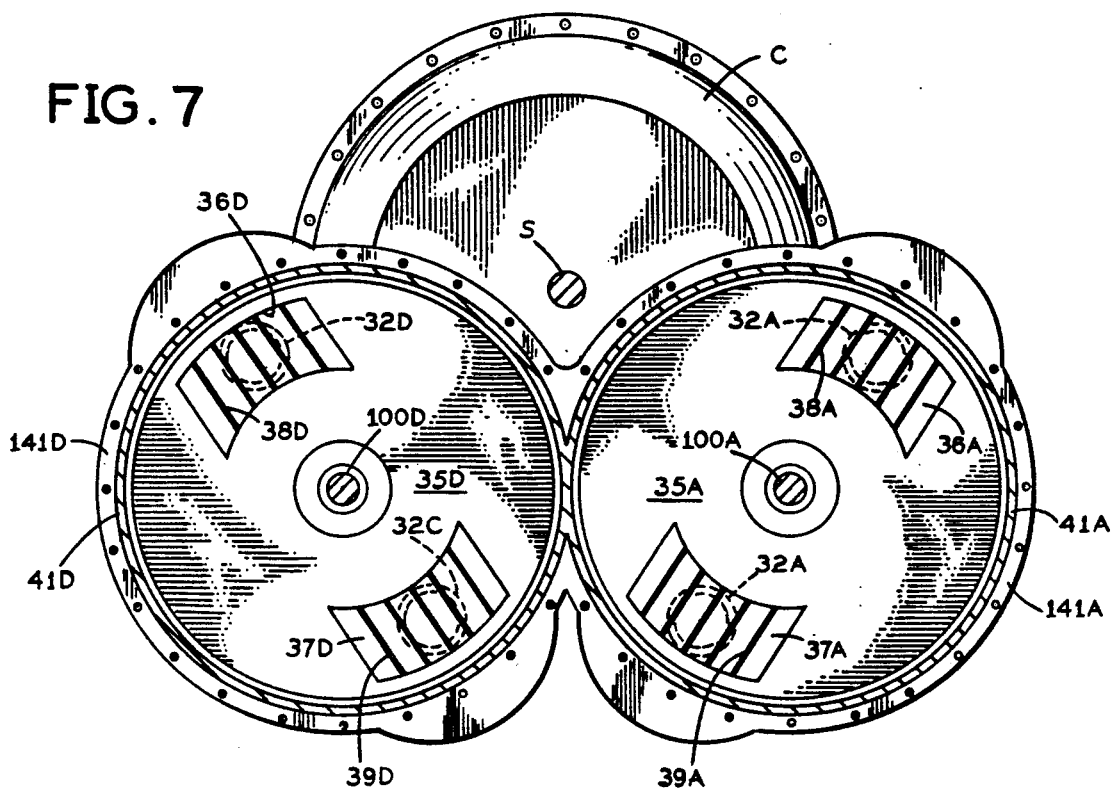
FIG. 7 is a cross-section taken along the line 7—7 in FIG. 2 and showing the diffusers at the end of the combustion chambers where the products of combustion are discharged.
Figure 11:
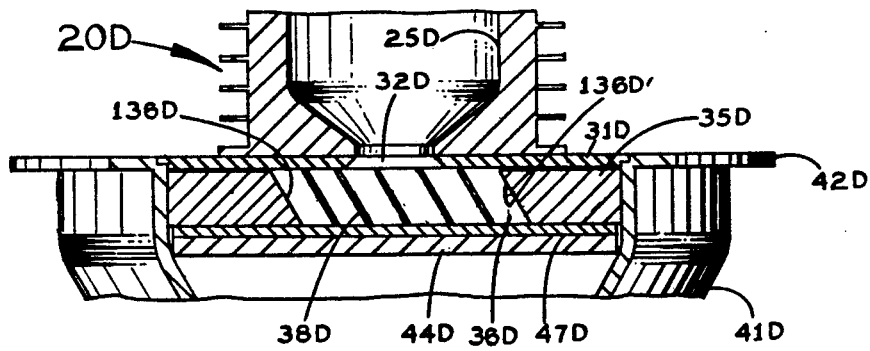
FIG. 11 is a cross-section taken along the line 11—11 in FIG. 10.

The diffuser 30D for combustion chambers 20C and 20D has a body 35D with a central opening which rotatably passes shaft 100D immediately to the right of bearing 34D in FIG. 9. As shown in FIG. 7, the diffuser body 35D is generally circular and has two diametrically opposed arcuate openings 36D and 37D which register respectively with the end plate openings 32D and 32C. Circumferentially spaced flat fins 38D are located in opening 36D, and similar fins 39D are located in opening 37D. These fins break up the flow of products of combustion from chambers 20C and 20D through diffuser body 35D. As shown in FIG. 11, the fins 38D in opening 36D of diffuser body 35D extend parallel to each other at an acute angle to the plane of end plate 31D, as do the opposite end edges 136D and 136D' of the opening 36D in which these fins are located. This is also true of fins 39D in opening 37D and the opposite end edges of these openings. The combustion products coming out of the combustion chambers 20C and 20D impinge on these fins and are deflected angularly by them.

On the side away from combustion chambers 20C and 20D, diffuser body 35D carries an inner carbon sealing ring 130D and an outer carbon sealing ring 131D.

Figure 16:
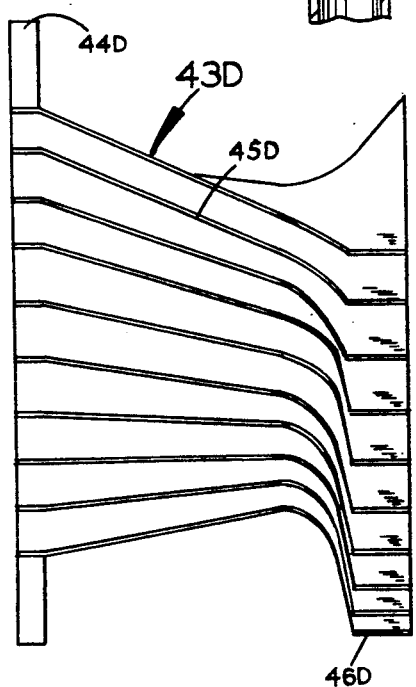
FIG. 16 is a side elevation of the turbine rotor.
Figure 9A:
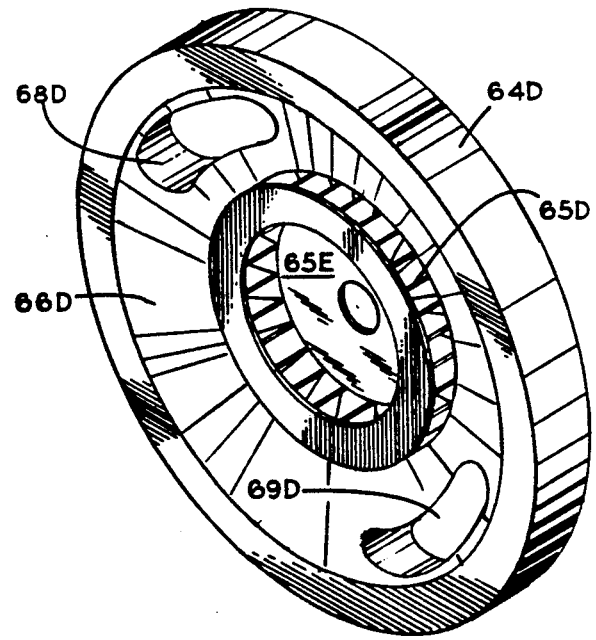
FIG. 9a is a perspective view of the inventive motor 64D and fan 65D assembly.

The turbine 40D has a rotor 43D as shown in FIG. 16. This rotor has a flat end piece 44D facing the diffuser 30D and a plurality of spirally wound blades 45D extending away from end piece 44D and terminating in laterally outwardly projecting arms 46D at the opposite end of this rotor. As shown in FIG. 9, the exposed end face of the turbine rotor's end piece 44D slidably engages the inner ring 130D on the diffuser body 35D.

Radially outward from the ring the end piece 44D of the turbine rotor carries a thin, flat, annular plate 47D of suitable anti-friction material which slidably engages the diffuser body 35D and its outer ring 131D. Plate 47D has arcuate openings that register with the openings 36D and 37D in the diffuser body 35D.

Figure 10:
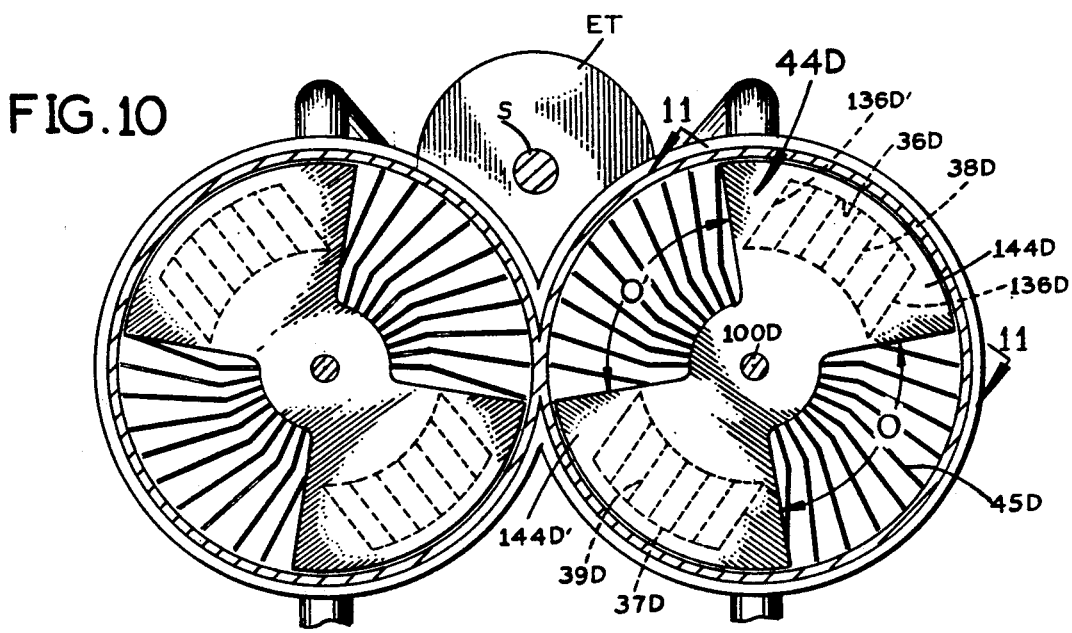
FIG. 10 is a cross-section taken along the line 10—10 in FIG. 2 at the inlet end of the turbines that are driven by the products of combustion from the internal combustion chambers.
Figure 15:
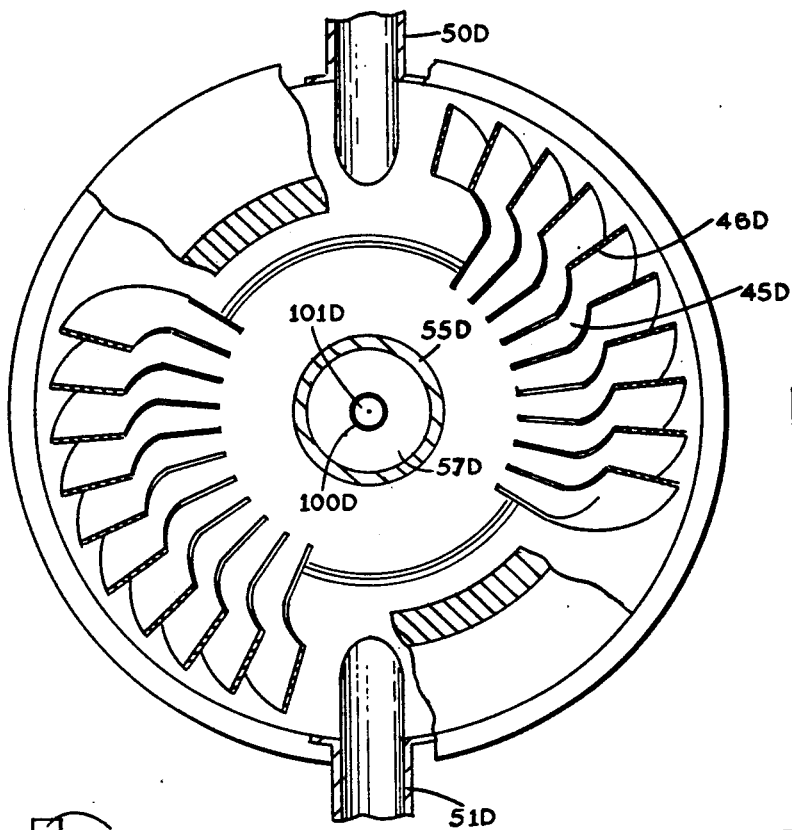
FIG. 15 is a cross-section taken along the line 15—15 in FIG. 9 through this turbine at its outlet end.

As shown in FIG. 10, the end piece 44D of the turbine rotor 43D has two opposite, arcuate, sector-shaped segments 144D and 144D' extending radially out from a central hub segment. In the rotational position shown in this Figure, these sector segments completely cover the openings 36D and 37D (shown in phantom) in diffuser body 35D and the corresponding openings in plate 47D. Circumferentially of the turbine between these sector segments 144D and 144D' the turbine rotor's end piece 44D defines arcuate openings O and O' which lead into the spaces between the blades 45D on this rotor. Openings O and O' in the turbine uncover the openings 36D and 37D in the diffuser body 35D and the corresponding openings in plate 47D in different rotational positions of the turbine rotor than the one shown in FIG. 10.

The fixed housing 41D of turbine 40D has a generally frustoconical shape to the right of its rotor's end piece 44D in FIG. 9. The rotor 43D of this turbine has a tapered annular wall 144D with a frustoconical segment extending from end piece 44D which has a smaller taper than the housing 41D so that together they define an annular passageway of progressively smaller size from left to right in FIG. 9. This annular passageway leads to an annular throat at 48D which opens into a wider annular region 49D to which discharge conduits 50D and 51D are connected. The housing 41D and the tapered annular wall 144D of turbine 43D define between them an annular passageeway which is venturi-shaped axially of the turbine. The blades 45D of the rotor 43D have a running fit with the inside of housing 41D along this annular venturi passageway, and the outwardly projecting arms 46D on these blades have a running fit in the wider annular region 49D of this passageway beyond its throat 48D. The gases going through these turbines undergo a venturi effect because of the restriction at throat 48D. The gases speed up when passing the restriction and then slow down, which enhances the jet action which in turn produces more spin on the turbine ET.

Referring to FIG. 9, the turbine rotor 43D has a hollow axial hub 52 which loosely surrounds the adjacent segment of shaft 100D. Here, shaft 100D has a central passage 101D and a plurality of openings 102D extending radially out from this passage. The hub 52D of the turbine rotor has radial openings 53D which register with the shaft at openings 102D at various times in the rotations of these two parts with respect to each other. These openings 53D lead to internal passages 145D in the rotor blades 45D for conducting cooling air, which is supplied from the two-stage compressor 10,10' (FIG. 1) to the shaft passage 100D through a conduit which is not shown in the drawings.

The housing of engine 40D has an internal end wall 54D located axially just beyond the tuurbine rotor 43D to the right in FIG. 9. This end wall has a cylindrical flange 55D which projects toward the end piece 44D on the opposite end of the turbine rotor. The hub 52D of the turbine rotor has an annular end flange 56D facing toward the end wall flange 55D. A needle bearing 57D is engaged between these flanges to take up axial thrusts on the turbine rotor.

The housing of turbine 40D has an outer end wall 58D that is offset axially from its inner end wall 54D to define an annular chamber 59D. Outer end wall 58D has an annular hub H holding a ball bearing B which rotatably supports this end of shaft 100D.

Similarly, the other two combustion chambers 20A and 20B are connected to the housing of a turbine 40A which has the same construction as turbine 40D. Elements of turbine 40A have the same reference numerals in FIGS. 2, 4, 7 and 10 as the corresponding elements of turbine 40D, but with an "A" suffix instead of a "D" suffix. The description of these elements will not be repeated.

Figure 5:
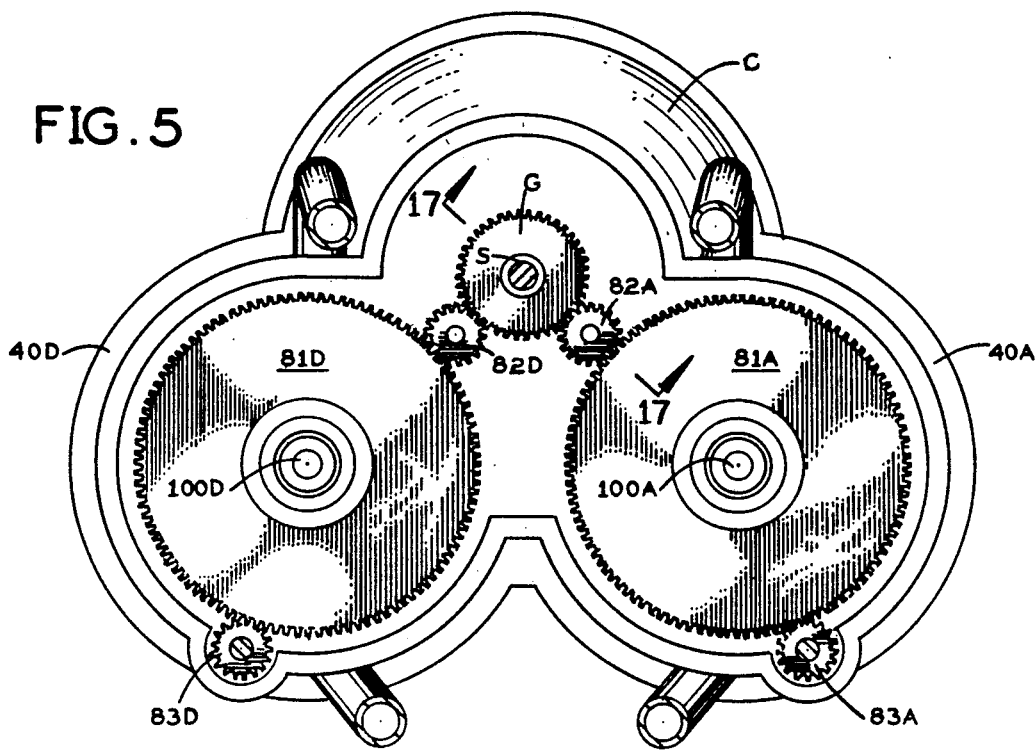
FIG. 5 is a cross-section taken along the line 5—5 in FIG. 2 through an output gear assembly in the engine apparatus.

The output gear assembly 80D in FIG. 1 includes a gear 81D (FIG. 9) rigidly attached to shaft 100D to rotate in unison with it. Gear 81D is located inside the end chamber 59D of the turbine housing. Similarly, an identical gear 81A (FIG. 5) is on the shaft 100A of the other turbine 40A. Gear 81A drives an idler gear 82A of much smaller diameter which meshes with a gear G affixed to output shaft S. Gear 81A also drives a smaller gear 83A whose rotation controls the operation of one or more accessories for combustion chambers 20A and 20B, such as a distributor, a fuel injection apparatus and/or a starter for turbine 40A.

Similarly, gear 81D on the shaft of turbine 40D drives a smaller idler gear 82D which meshes with gear G. Also, gear 81D drives a smaller gear 83D for operating accessories for combustion chambers 20C and 20D.

As shown in FIG. 16, lines 480 may interconnect the low pressure points of some chambers with other chambers to provide increased suction there.

Figures 17, 18:
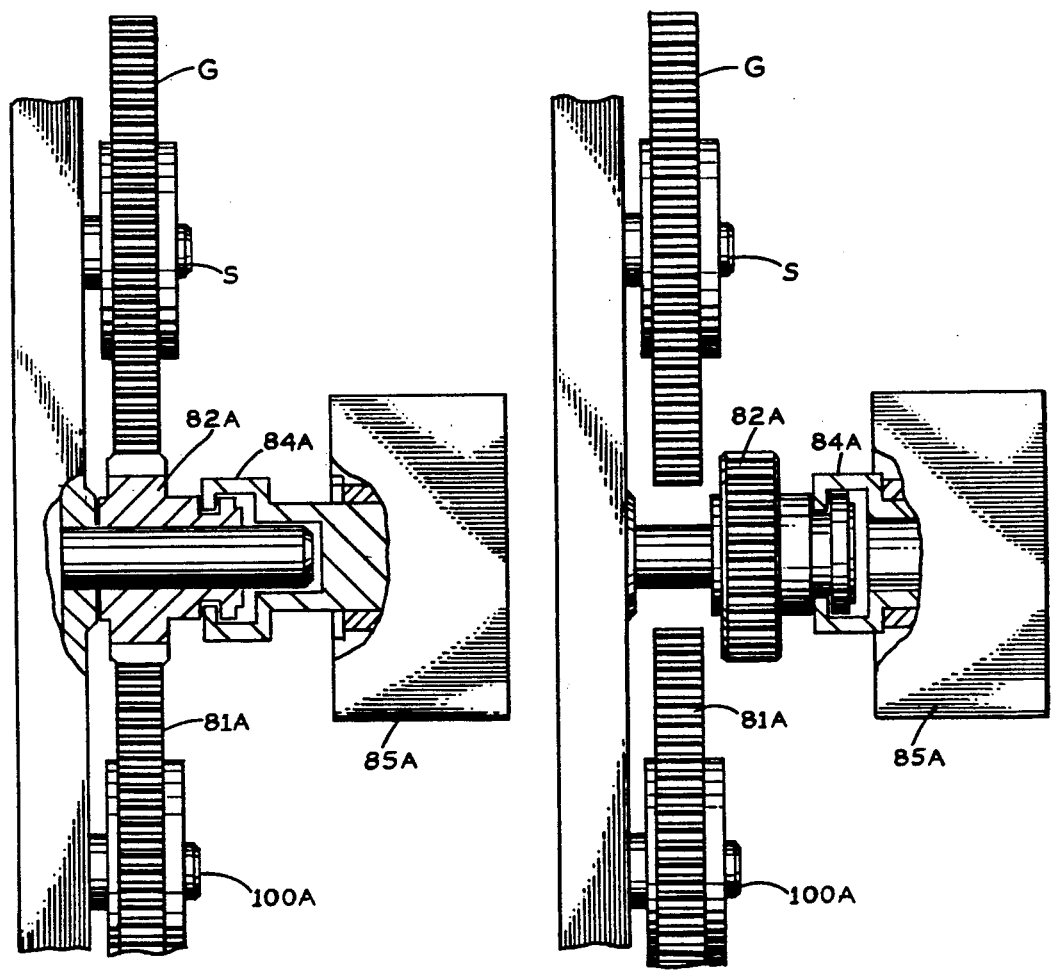
FIG. 17 is a section taken along the line 17—17 in FIG. 5 through part of the output gearing when the gears are engaged.
FIG. 18 is a view like FIG. 17 but with the gears disengaged.
Figure 12:
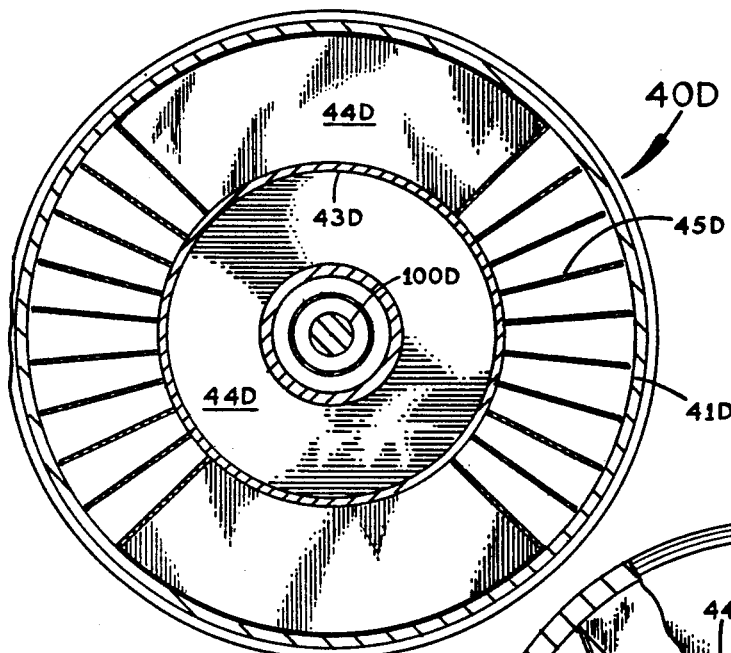
FIG. 12 is a cross-section taken along the line 12—12 in FIG. 9 through one of the turbines near its inlet end.
Figure 14:
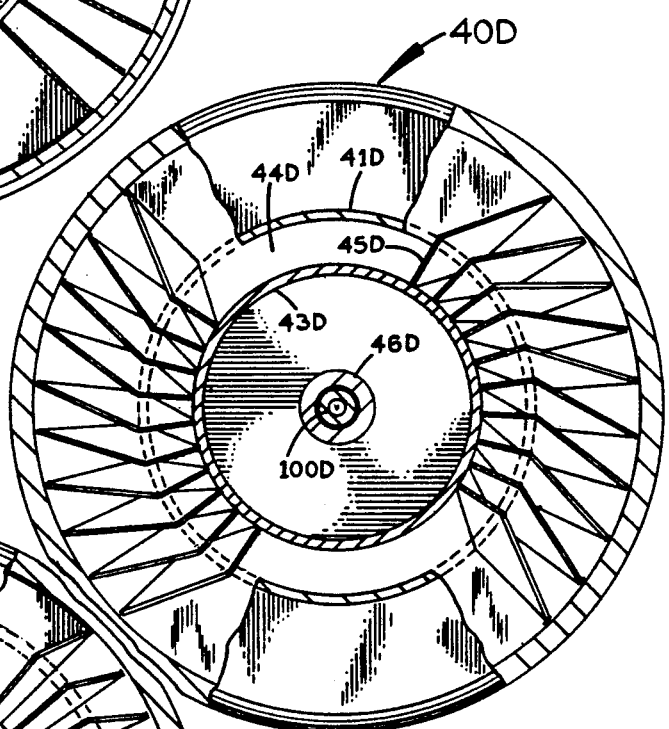
FIG. 14 is a cross-section taken along the line 14—14 in FIG. 9.
Figure 13:
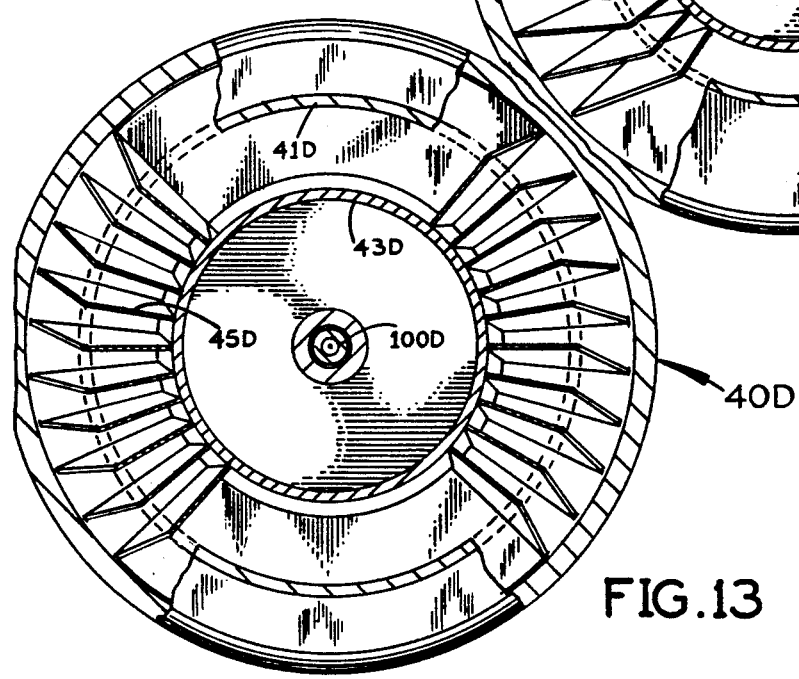
FIG.13 is a cross-section taken along the line 13—13 in FIG. 9 through this turbine about midway along its length.

As shown in FIGS. 17 and 18, the idler gear 82A is slidably retractable from its operative position (FIG. 17) engaging gears G and 81A to an inoperative position (FIG. 18) disengaged from both of these gears. The reciprocable plunger 84A of a solenoid 85A pulls gear 82A to its inoperative position when the coil of solenoid 85A is energized. This could be done for example to disengage one turbine which has overheated or otherwise malfunctioned, permitting the system to operate on the other turbine.

An identical arrangement is provided for selectively disengaging idler gear 82D (FIG. 5) from gears 81D and G.

The exhaust turbine ET is driven by the products of combustion leaving the turbines at 50A, 51A, 50D and 51D.

In the operation of this engine apparatus, the inlet valves at 60A and 60D control the admission of pressurized air into the combustion chambers in timed relation with the rotation of shaft S. Also, the valving actions provided by the end pieces of the turbines (e.g., end piece 44D of turbine 40D) occur in timed relation with the rotation of shaft S (which the turbines drive through the gearing at 80). In each cycle of operation of each pair of internal combustion chambers, the outlet end of each chamber is blocked when its inlet valve opens to admit pressurized air into that combustion chamber. Fuel is introduced into each combustion chamber in timed relation with the admission of pressurized air so that a properly mixed combustible fuel/air mixture is obtained before the spark plug is fired to ignite that mixture. Then, the outlet end of each combustion chamber is opened by the end piece of the corresponding turbine, releasing the pressurized products of combustion from the combustion chambers into the corresponding turbine.

I claim:

1. An internal combustion engine apparatus comprising:
    means defining an internal combustion chamber having opposite first and second ends;
    means for introducing fuel into said chamber;
    means for admitting air into said chamber at said first end thereof to mix with fuel therein and form a combustible fuel/air mixture;
    means for igniting the fuel/air mixture in said chamber;
    means at said second end of said chamber for passing the pressurized products of combustion therefrom;

a turbine driven by the pressurized products of combustion leaving said second end of said chamber;

a diffuser comprising a diffuser plate rotatably mounted between said turbine and said combustion chamber, said plate comprising a diffuser opening which registers with said second end of said chamber, said diffuser containing a plurality of fin members oriented to deflect angularly said pressurized products of combustion leaving said second end of said combustion chamber for breaking up the flow of said pressurized products of combustion leaving said chamber before they reach said turbine.

2. An engine apparatus according to claim 1 and further comprising rotary output shaft means driven from said turbine, and wherein:

said means for admitting air into said combustion chamber is a rotary first valve driven from said output shaft means;

and said means for passing the products of combustion from said combustion chamber is a rotary second valve member which is part of said turbine.

3. An engine apparatus according to claim 2 and further comprising air compressor means driven from said output shaft means and supplying pressurized air to said combustion chamber through said rotary first valve.

4. An engine apparatus according to claim 1 wherein said turbine comprises;

a housing extending next to said second end of said internal combustion chamber and having a chamber of annular cross-section which is elongated in a direction away from internal combustion chamber, and a rotor in said chamber of said housing, said housing having passage means located away from said internal combustion chamber for passing the products of combustion from said chamber in said housing, said rotor having a plurality of circumferentially spaced blades with a running fit in said chamber of said housing.

5. An engine apparatus according to claim 1 wherein said turbine comprises:

a housing extending next to said second end of said internal combustion chamber and having a chamber of annular cross-section which is elongated in a direction away from internal combustion chamber, and a rotor in said chamber of said housing, said chamber of said housing being venturi-shaped in longitudinal section in said direction away from said internal combustion chamber, said housing having passage means located away from said internal combustion chamber for passing the products of combustion from said chamber in said housing;

said rotor having a plurality of circumferentially spaced blades with a running fit in said chamber of said housing 6. An engine apparatus according to claim 5 and further comprising rotary output shaft means driven from said rotor, and wherein:

said means for admitting air into said combustion chamber is a rotary first valve driven from said output shaft means.

7. An engine apparatus according to claim 6 and further comprising an air compressor means driven from said output shaft means and supplying pressurized air to said combustion chamber through said rotary first valve.

8. An engine apparatus according to claim 2 wherein said rotary first valve comprises:

a rotor having a central opening, fan blades in said central opening, and an arcuate opening radially outward from said central opening;

said engine apparatus further comprising air compressor means driven from said output shaft means and having connections to said rotor to supply pressurized air to said fan blades in said central opening and to supply pressurized air to said arcuate opening;

said rotary first valve having seal means between said central opening and said arcuate opening in the rotor to segregate the respective air flows to said openings.

9. An internal combustion engine apparatus comprising:

first and second housings respectively defining first and second internal combustion chambers, each of said combustion chambers having opposite first and second ends;

first fuel supply means for introducing fuel into said first combustion chamber;

second fuel supply means for introducing fuel into said second combustion chamber;

a rotary inlet valve controlling the admission of air into said first end of both said combustion chambers;

air compressor means for supplying pressurized air to said inlet valve to enter said first and second combustion chambers to mix with the fuel therein;

means for igniting the fuel/air mixture in said first combustion chamber;

means for igniting the fuel/air mixture in said second combustion chamber;

means at said second end of said first combustion chamber for passing the pressurized products of combustion therefrom;

means at said second end of said second combustion chamber for passing the pressurized products of combustion therefrom;

a turbine driven by the pressurized products of combustion leaving said second end of both said first and second combustion chambers;

wherein said rotary inlet valve comprises a rotor having a central opening, a centrifugal fan having fan blades in said central opening, and a pair of arcuate openings located radially outward from said central opening, each said opening having an entrance angled with respect to the axis of said rotor to receive air thrown radially outward from said centrifugal fan and registrable with said first end of each of said combustion chambers in different rotational positions of said rotor, said fan blades serving to increase the velocity of air entering said arcuate openings and said chambers;

air compressor means driven from output shaft means and having connections to said rotor to supply pressurized air to said fan blades in said central opening and to supply pressurized air to said arcuate openings;

said rotary inlet valve having seal means between said central opening and said arcuate openings in the rotor to segregate the respective air flows to said openings.

10. An internal combustion engine apparatus comprising:

first and second housings respectively defining first and second internal combustion chambers, each of said combustion chambers having opposite first and second ends;

first fuel supply means for introducing fuel into said first combustion chamber;

second fuel supply means for introducing fuel into said second combustion chamber;

inlet valve means controlling the admission of air into said first end of both said combustion chambers;

air compressor means for supplying pressurized air to said inlet valve to enter said first and second combustion chambers to mix with the fuel therein;

means for igniting the fuel/air mixture in said first combustion chamber;

means for igniting the fuel/air mixture in said second combustion chamber;

means at said second end of said first combustion chamber for passing the pressurized products of combustion therefrom;

means at said second end of said second combustion chamber for passing the pressurized products of combustion therefrom;

a turbine driven by the pressurized products of combustion leaving said second end of both said first and second combustion chambers;

wherein said inlet valve comprises a rotor having a central opening, fan blades in said central opening, and a pair of arcuate openings located radially outward from said central opening, each said opening having an entrance extending along a line intersecting acutely the axis of said rotor to overhang said fan blades and registrable with said first end of each of said combustion chambers in different rotational positions of said rotor, said fan blades serving to increase the velocity of air entering said arcuate openings and said chamber;

air compressor means driven from said output shaft means and having connections to said rotor to supply pressurized air to said fan blades in said central opening and to supply pressurized air to said arcuate openings;

said rotary inlet valve having seal means between said central opening and said arcuate opening in the rotor to segregate the respective air flows to said openings.

11. An engine apparatus according to claim 10 wherein said turbine comprises a rotor having:

an end piece facing said second end of both said first and second combustion chambers, said end piece having openings therein which register respectively with said combustion chambers to pass pressurized products of combustion therefrom in different rotational positions of said rotor of the turbine, and a plurality of turbine blades extending from said end piece and exposed to the pressurized products of combustion passing through said openings in said end piece.

12. An engine apparatus according to claim 11 and further comprising:

a diffuser located between said turbine and said second end of both said first and second combustion chambers, said diffuser having means for deflecting angularly the pressurized products of combustion leaving said second end of said combustion chambers.

13. An engine apparatus according to claim 9 wherein said turbine comprises a rotor having:

an end piece facing said second end of both said first and second combustion chambers, said end piece having openings therein which register respectively with said combustion chambers to pass pressurized products of combustion therefrom in different rotational positions of said rotor of the turbine, and a plurality of turbine blades extending from said end piece and exposed to the pressurized products of combustion passing through said openings in said end piece.

14. An engine apparatus according to claim 13 and further comprising:

a diffuser located between said turbine and said second end of both said first and second combustion chambers, said diffuser having means for deflecting angularly the pressurized products of combustion leaving said second end of said combustion chambers.

15. An internal combustion engine according to claim 9, wherein said turbine has turbine blades and has a housing which has a narrowed throat portion adjacent to said turbine blades for creating a venturi effect and enhancing jet flow of the gases, wherein said turbine blades are sized to follow the contours of said narrowed throat portion.

16. An internal combustion engine according to claim 9, additionally comprising:

output means driven by said turbine, said output means having a disengageable portion for disengaging said output means from said turbine when desired.

17. An internal combustion engine apparatus comprising:

means defining an internal combustion chamber having opposite first and second ends;

means for introducing fuel into said chamber;

means for admitting air into said chamber at said first end thereof to mix with fuel therein and form a combustible fuel/air mixture;

means for igniting the fuel/air mixture in said chamber;

means at said second end of said chamber for passing the pressurized products of combustion therefrom;

a turbine driven by the pressurized products of combustion leaving said second end of said chamber;

rotary output shaft means driven from said turbine, and wherein said means for admitting air into said combustion chamber is a rotary first valve driven from said output shaft means and said means for passing the products of combustion from said combustion chamber is a rotary second valve member which is part of said turbine, wherein said rotary inlet valve comprises a rotor having a central opening, a centrifugal fan having fan blades in said central opening, and a pair of arcuate openings located radially outward from said central opening, each said opening having an entrance angled with respect to the axis of said rotor to receive air thrown radially outward from said centrifugal fan and registrable with said first end of each of said combustion chambers in different rotational positions of said rotor, said fan blades serving to increase the velocity of air entering said arcuate openings and said chamber;

air compressor means driven from said output shaft means and having connections to said rotor to supply pressurized air to said fan blades in said central opening and to supply pressurized air to said arcuate opening.

18. An internal combustion engine apparatus comprising:

means defining an internal combustion chamber having opposite first and second ends;

means for introducing fuel into said chamber;

means for admitting air into said chamber at said first end thereof to mix with fuel therein and form a combustible fuel/air mixture;

means for igniting the fuel/air mixture in said chamber;

means at said second end of said chamber for passing the pressurized products of combustion therefrom;

a turbine comprising turbine blades and driven by the pressurized products of combustion therefrom;

a turbine housing which has a narrowed throat portion adjacent to said turbine blades for creating a venturi effect and enhancing jet flow of the gases, wherein said turbine blades are sized to follow the contours of said narrowed throat portion;

rotary output shaft means driven from said turbine, and wherein said means for admitting air into said combustion chamber is a rotary first valve driven from said output shaft means and said means for passing the products of combustion from said combustion chamber is a rotary second valve member which is part of said turbine;

wherein said rotary first valve comprises a rotor having a central opening, fan blades in said central opening, and an arcuate opening radially outward from said central opening, said opening having an entrance extending along a line intersecting acutely the axis of said rotor to overhang said fan blades and having seal means between said central opening and said arcuate opening in the rotor to segregate the respective air flows to said openings, said fan blades serving to increase the velocity of air entering said arcuate openings and said chamber;

air compressor means driven from said output shaft means and having connections to said rotor to supply pressurized air to said fan blades in said central opening and to supply pressurized air to said arcuate opening.

19. An internal combustion engine according to claim 1, wherein said diffuser opening is arcuate and said fin members are circumferentially spaced and mutually parallel, and angled laterally with respect to said diffuser plate.

20. An internal combustion engine apparatus comprising:

means defining an internal combustion chamber having opposite first and second ends;

means for introducing fuel into said chamber;

means for admitting air into said chamber at said first end thereof to mix with fuel therein and form a combustible fuel/air mixture;

means for igniting the fuel/air mixture in said chamber;

means at said second end of said chamber for passing the pressurized products of combustion therefrom;

a turbine driven by the pressurized products of combustion leaving said second end of said chamber;

a diffuser comprising a diffuser plate and extending between said turbine and said combustion chamber, said plate comprising a diffuser opening which registers with said second end of said chamber, said diffuser containing a plurality of fin members for deflecting angularly said pressurized products of combustion leaving said second end of said combustion chamber for breaking up the flow of said pressurized products of combustion leaving said chamber;

rotary output shaft means driven from said turbine wherein said means for admitting air into said combustion chamber is a rotary first valve driven from said output shaft means;

and said means for passing the products of combustion from said combustion chamber is a rotary second valve member which is part of said turbine;

wherein said rotary first valve comprises a rotor having a central opening, fan blades in said central opening, and an arcuate opening radially outward from said central opening;

said engine apparatus further comprising air compressor means driven from said output shaft means for having connections to said rotor to supply pressurized air to said fan blades in said central opening and to supply pressurized air to said arcuate opening;

said rotary first valve having seal means between said central opening and said arcuate opening in the rotor to segregate the respective air flows to said openings.

* * * * *